US007944447B2

(12) United States Patent
Clegg et al.

(10) Patent No.: US 7,944,447 B2
(45) Date of Patent: *May 17, 2011

(54) ADAPTIVE AND DYNAMIC TEXT FILTERING

(75) Inventors: Derek B. Clegg, Redwood City, CA (US); Haroon Sheikh, Campbell, CA (US)

(73) Assignee: Apple Inc., Cupertino, CA (US)

( * ) Notice: Subject to any disclaimer, the term of this patent is extended or adjusted under 35 U.S.C. 154(b) by 653 days.

This patent is subject to a terminal disclaimer.

(21) Appl. No.: 11/770,612

(22) Filed: Jun. 28, 2007

(65) Prior Publication Data

US 2008/0316211 A1 Dec. 25, 2008

Related U.S. Application Data

(60) Provisional application No. 60/945,901, filed on Jun. 22, 2007.

(51) Int. Cl.
*G06T 11/00* (2006.01)

(52) U.S. Cl. ..................... 345/469; 345/469.1; 345/470; 345/471

(58) Field of Classification Search ........................ None
See application file for complete search history.

(56) References Cited

U.S. PATENT DOCUMENTS

| | | | | |
|---|---|---|---|---|
| 5,673,371 | A * | 9/1997 | Koopman et al. | 358/1.11 |
| 5,852,448 | A * | 12/1998 | Cheng | 345/469 |
| 5,870,107 | A | 2/1999 | Fujisawa et al. | |
| 6,069,554 | A * | 5/2000 | Hoel | 340/146.2 |
| 6,073,147 | A | 6/2000 | Chan et al. | |
| 6,266,070 | B1 | 7/2001 | Shigi et al. | |
| 6,501,475 | B1 * | 12/2002 | Cheng | 345/467 |
| 6,624,828 | B1 * | 9/2003 | Dresevic et al. | 715/771 |
| 6,867,787 | B1 | 3/2005 | Shimizu et al. | |
| 7,535,471 | B1 * | 5/2009 | Mansfield | 345/467 |
| 2001/0048764 | A1 * | 12/2001 | Betrisey et al. | 382/162 |
| 2002/0186229 | A1 * | 12/2002 | Brown Elliott | 345/649 |
| 2003/0085870 | A1 * | 5/2003 | Hinckley | 345/156 |
| 2004/0212620 | A1 * | 10/2004 | Dowling et al. | 345/467 |
| 2004/0233620 | A1 * | 11/2004 | Doczy et al. | 361/680 |
| 2006/0123362 | A1 * | 6/2006 | Keely | 715/857 |
| 2006/0238517 | A1 | 10/2006 | King et al. | |
| 2007/0085759 | A1 * | 4/2007 | Lee et al. | 345/1.1 |

* cited by examiner

*Primary Examiner* — Andrew Wang
*Assistant Examiner* — David H Chu
(74) *Attorney, Agent, or Firm* — Blakely, Sokoloff, Taylor & Zafman LLP

(57) ABSTRACT

A device sensor determines an external state of a device. Text to be displayed on a display screen of the device is dynamically filtered based on the external state of the device.

17 Claims, 12 Drawing Sheets

ADAPTIVE AND DYNAMIC TEXT FILTERING

This U.S. application claims priority to Provisional Application No. 60/945,901 on Jun. 22, 2007.

FIELD

Embodiments of the invention relate to data processing. More particularly, the invention relates to filtering text for display on a display screen.

BACKGROUND

Many different electronic displays exist today for a plurality of devices, including a variety of desktop and laptop computer displays, Personal Digital Assistants (PDAs), cellular telephones, MP3 players, and portable gaming systems. Various applications exist for using such displays in different types of lighting (e.g., low to high light levels) at different angles of viewing (e.g., straight ahead, from above, or to the side), or different orientations of the display (e.g., vertical or horizontal). The technical features of the various displays widely vary (e.g., dots or pixels per inch (DPI), the number of horizontal and/or vertical lines may be greater for a laptop display than for a cellular telephone display).

Various filters, processes and/or algorithms (e.g., character dilation, smoothing filters, sharpening filters, etc.) can be used to render text on the aforementioned display screens. These filters, algorithms and/or processes for rendering text on a display screen are typically implemented according to a static configuration. For example, one static filter might be used to render text on a display screen of a device primarily used outdoors in an environment with lots of light; another filter might be used to render text on a display screen of a device primarily used indoors. In other words, external conditions (e.g., light levels, device orientation, etc.) may factor into the choice and/or design of various filters. However, current text rendering systems/programs are static—text is always rendered according to the same configuration. While some systems may allow a user to manually select between two static configurations, there are situations in which it would be preferable to have dynamic and/or adaptive filtering.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

The precise algorithms and filters for rendering text on a display screen are beyond the scope of the invention and will not be discussed in detail, except as they relate to embodiments described herein.

As used herein, the term "text" refers to any character or combination of characters in a character set including, but not limited to, a letter, a number, or a symbol. Text rendered on a display screen is referred to herein as a glyph. An outline is a collection of lines and curves to depict a character before creation of a glyph.

In a typical text rendering system, a set of outline points for a character are retrieved. A character may be identified by a single byte value (e.g., from $00 to $FF) or by multiple bytes (e.g., two bytes for the Japanese language) or another form of identifier. Upon recognizing a value identifying a specific character of a character set (e.g., uppercase "A"), the set of outline points may be retrieved for that character.

Once the set of outline points has been retrieved, the curves of an outline are calculated from the collection of points. In one embodiment, two types of outline points exist: on-curve points and off-curve points. The on-curve points define the endpoints of a curve. The off-curve points are used in determining the curvature of the curve. If no off-curve point exists for two on-curve points defining a curve, then the curve is straight line between the two on-curve points. In one embodiment, the module uses a parametric Bezier equation with the on-curve and off-curve points as input in order to draw the collection of curves and thus the outline. In other embodiment, the curves may be defined by any type of equation or algorithm (e.g., Frenet-Serret formula).

Figure 1:
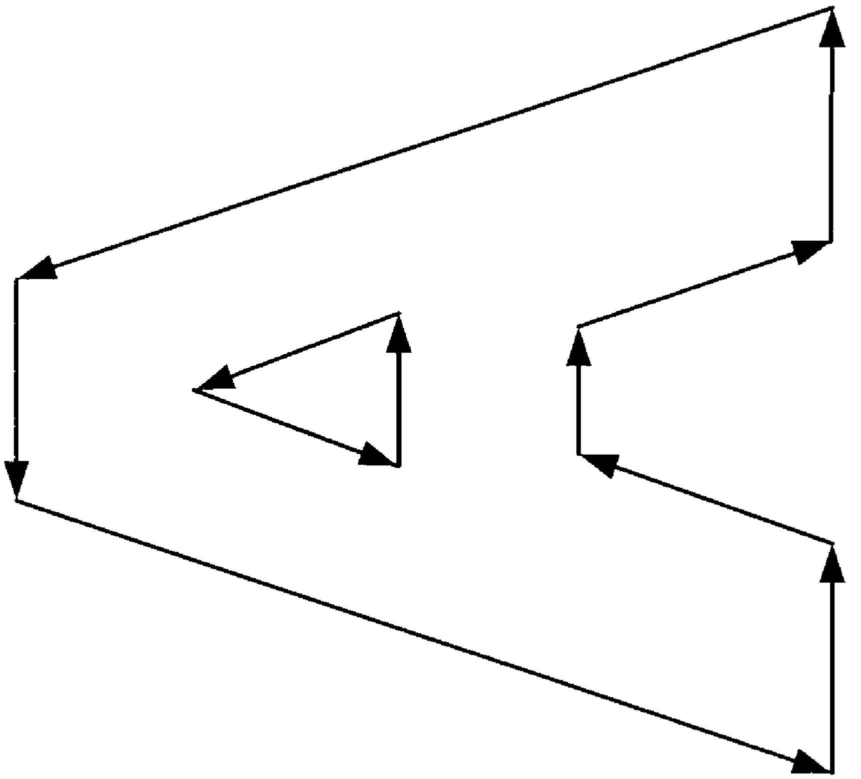
FIG. 1 illustrates an example outline of an uppercase "A".

FIG. 1 illustrates an example outline of an uppercase "A". In some embodiments, the outline may be stored as a collection of points and an algorithm to "connect the dots". In other embodiments, the outline may be stored a collection of individual lines and/or vectors having a direction and a magnitude. When the individual lines are combined or the points are connected, the result is the uppercase "A" shown in FIG. 1. While the lines of the uppercase "A" are all straight lines, one of skill in the art recognizes that many characters include curved lines.

Figure 2:
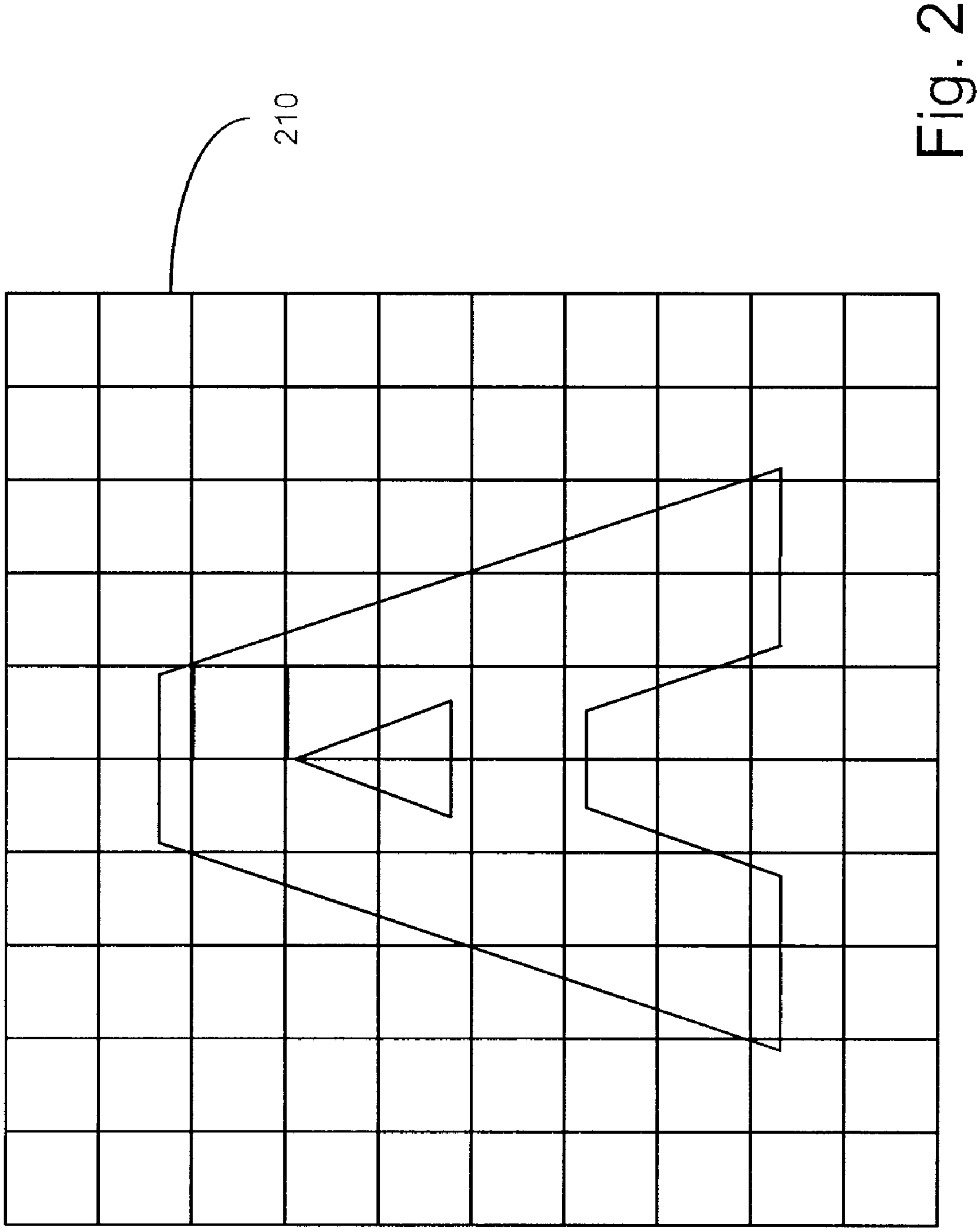
FIG. 2 illustrates the uppercase "A" of FIG. 1 laid out on a pixel grid.
Figure 2B:
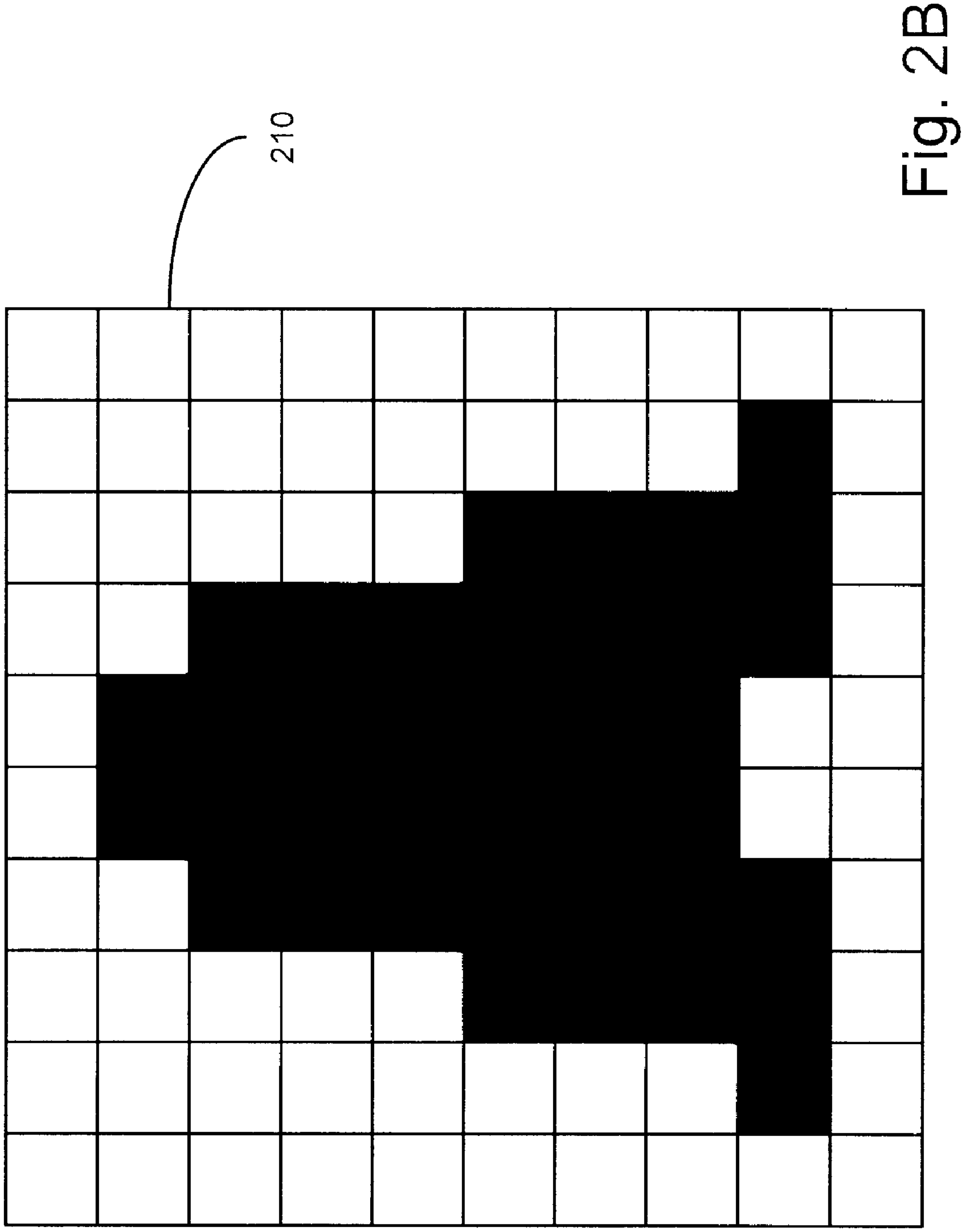
FIGS. 2B-C illustrate the rasterization of the uppercase "A" of FIG. 1.

FIGS. 2A and 2B illustrate the rasterization of an uppercase "A". As used herein, rasterization is the process of converting an outline into a bitmapped image. In FIG. 2A, the uppercase "A" is shown on a pixel grid 210. Each of the squares on pixel grid 210 represents a single pixel in this example. In some embodiments, the uppercase "A" outline is mapped to individual pixels on the pixel grid. Once the outline has been mapped to individual pixels, the pixels that are part of the bitmapped image are colored (e.g., black). The specific algorithms and/or processes for rasterizing an image are beyond the scope of the invention. It is sufficient to note that one or more algorithms may be used during rasterization.

Figure 2C:
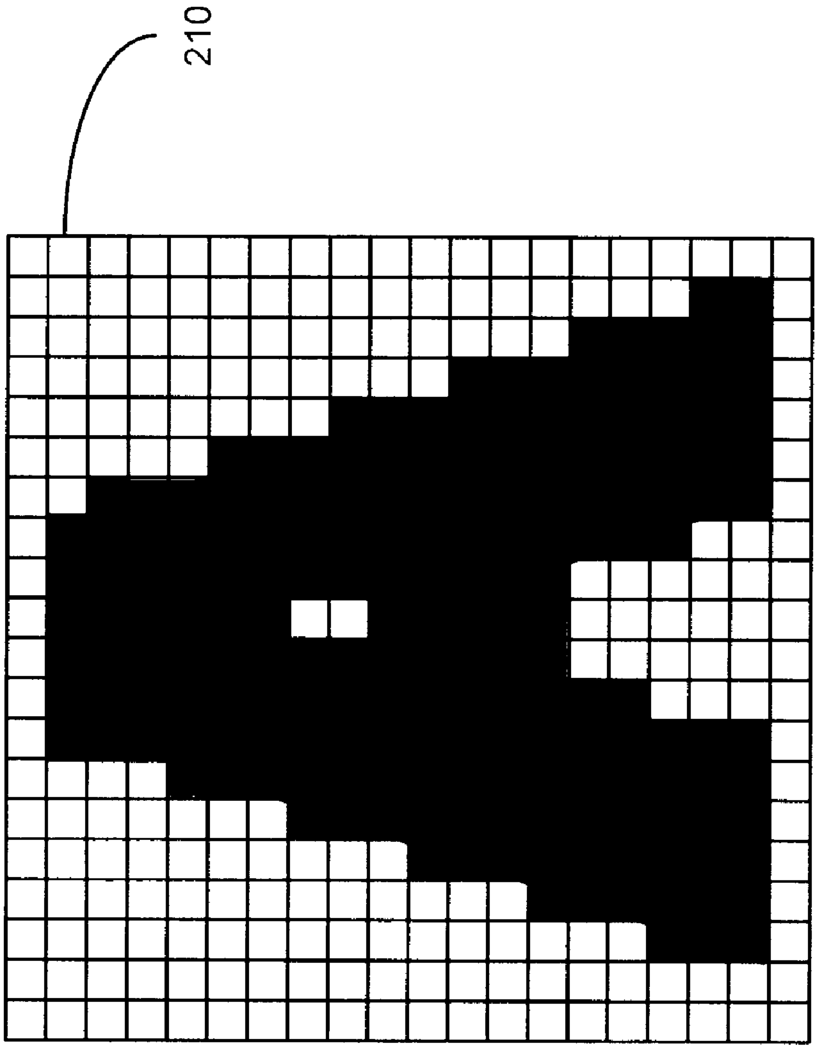

FIG. 2B shows the rasterization of the uppercase "A" of FIG. 2A based on an algorithm that completely colors any pixel covered (in part or in whole) by the uppercase "A". Given the size of the pixels relative to the size of the uppercase "A" in FIGS. 2A and 2B, the resolution of the rasterized image in FIG. 2B is poor. Simply decreasing the pixel size will increase the resolution/appearance of the rasterized image (e.g., FIG. 2C). However, other techniques (e.g., algorithms) may be used to further improve the appearance the rasterized image.

Figure 3:
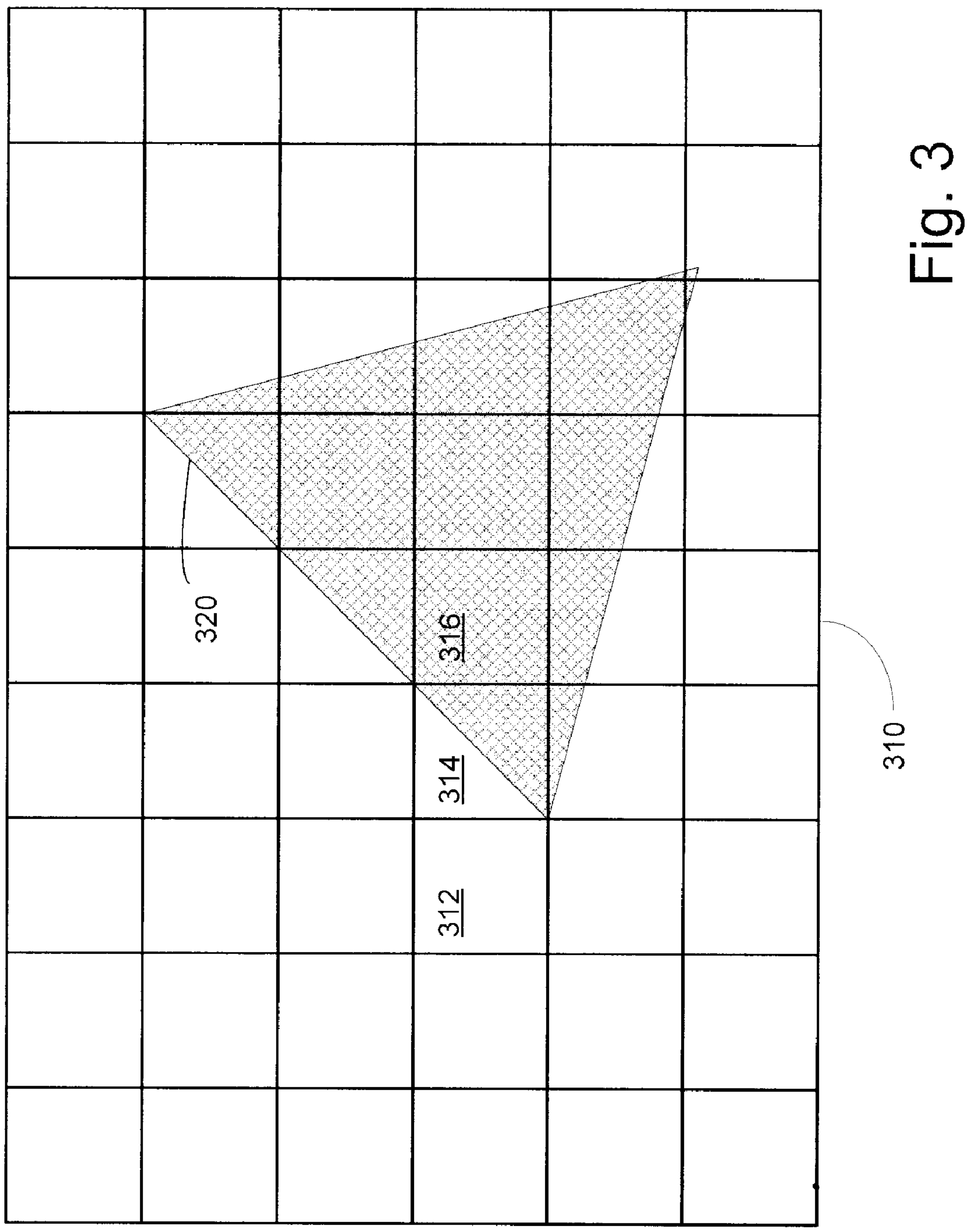
FIG. 3 illustrates the rasterization of a triangle.

One technique that can be used to improve the appearance of a rasterized image is to shade a pixel based on the coverage of the pixel. For example, pixel 316 of FIG. 3 is 100% covered by a triangle image 320. Thus, in some embodiments, pixel 316 might be colored with a grayscale value of 100% (e.g., completely black in color). Pixel 314, however, is only 50% covered by triangle 320. Thus, pixel 314 might be colored with a grayscale value of 50% (e.g., medium gray in color). Pixel 312 is not covered at all (i.e., 0%) by triangle 320; thus, pixel 312 would be colored with a grayscale value of 0% (e.g., no color/shading). The relationship between percentage of pixel coverage and grayscale values can be different in other embodiments.

Figure 4:
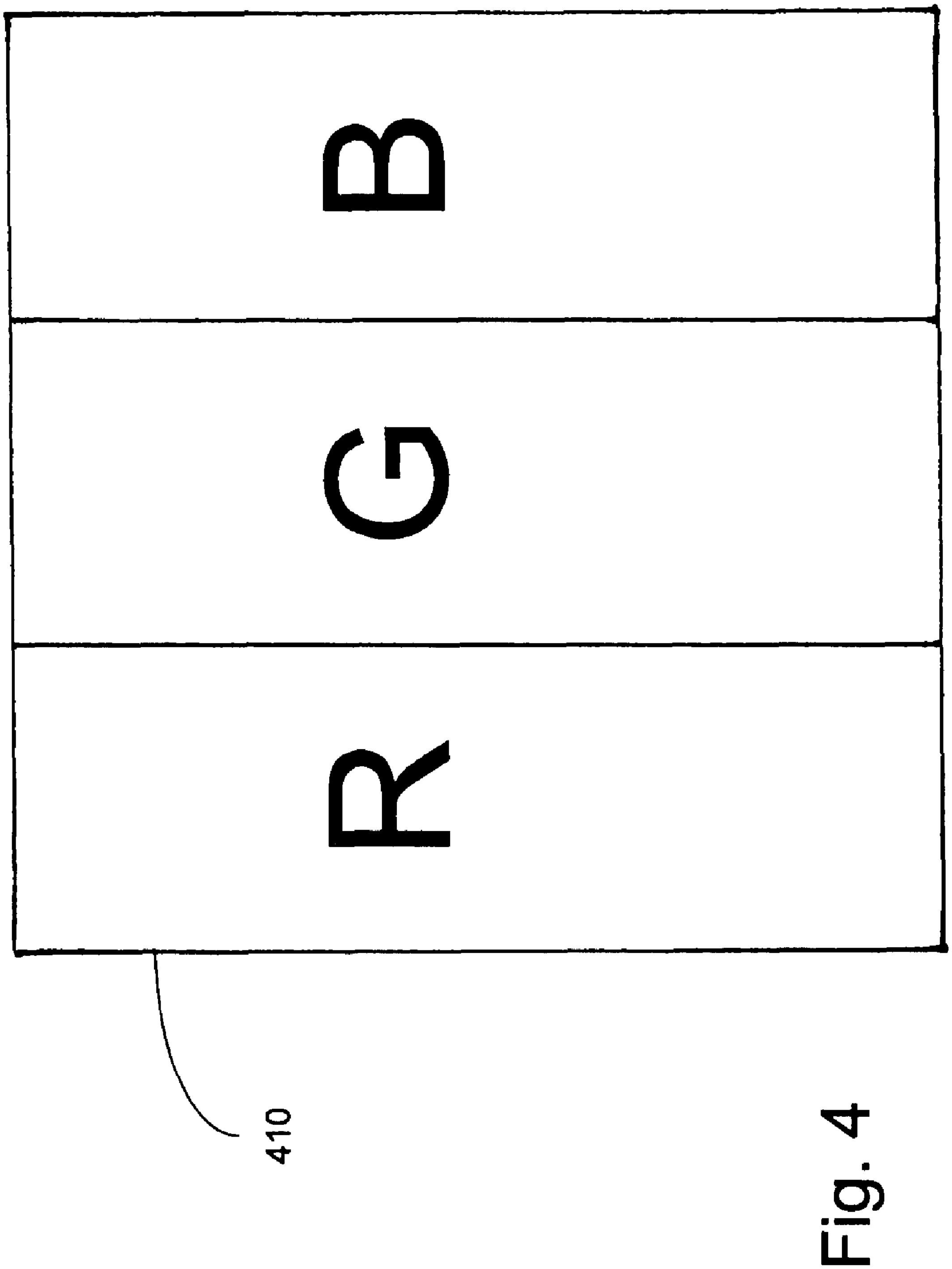
FIG. 4 illustrates an RGB pixel according to a first orientation.

FIG. 4 illustrates the structure of a typical liquid crystal display (LCD) pixel. Pixel 410 is square but is physically divided three equal sub-pixels, with each of the three sub-pixels being dedicated to one of the three colors in the RGB color space (i.e., red, green and blue). Thus, one third of the pixel is entirely dedicated to displaying red, one third to displaying green and one third to displaying blue. While the R-G-B layout shown in FIG. 4 is common, other layouts could also be used (e.g., R-B-G, B-R-G, etc.). In some embodiments, additional sub-pixels may be used (e.g., an additional white sub-pixel to create an RGBW (red, green, blue, white) layout).

Using an 8-bit RGB color scheme as an example, each sub-pixel in pixel 410 has 256 possible values. Thus, a pixel having the RGB values [255, 0, 0] produces a red-colored pixel; RGB values of [0, 255, 0] produces a green-colored pixel, etc. The 8-bit RGB color scheme and sub-pixel layout is used by way of illustration only herein. Other schemes, layouts and/or pixel types can be used in embodiments of the invention; it is sufficient for the description herein to recognize that each sub-pixel in a pixel can have different values.

Figure 5A:
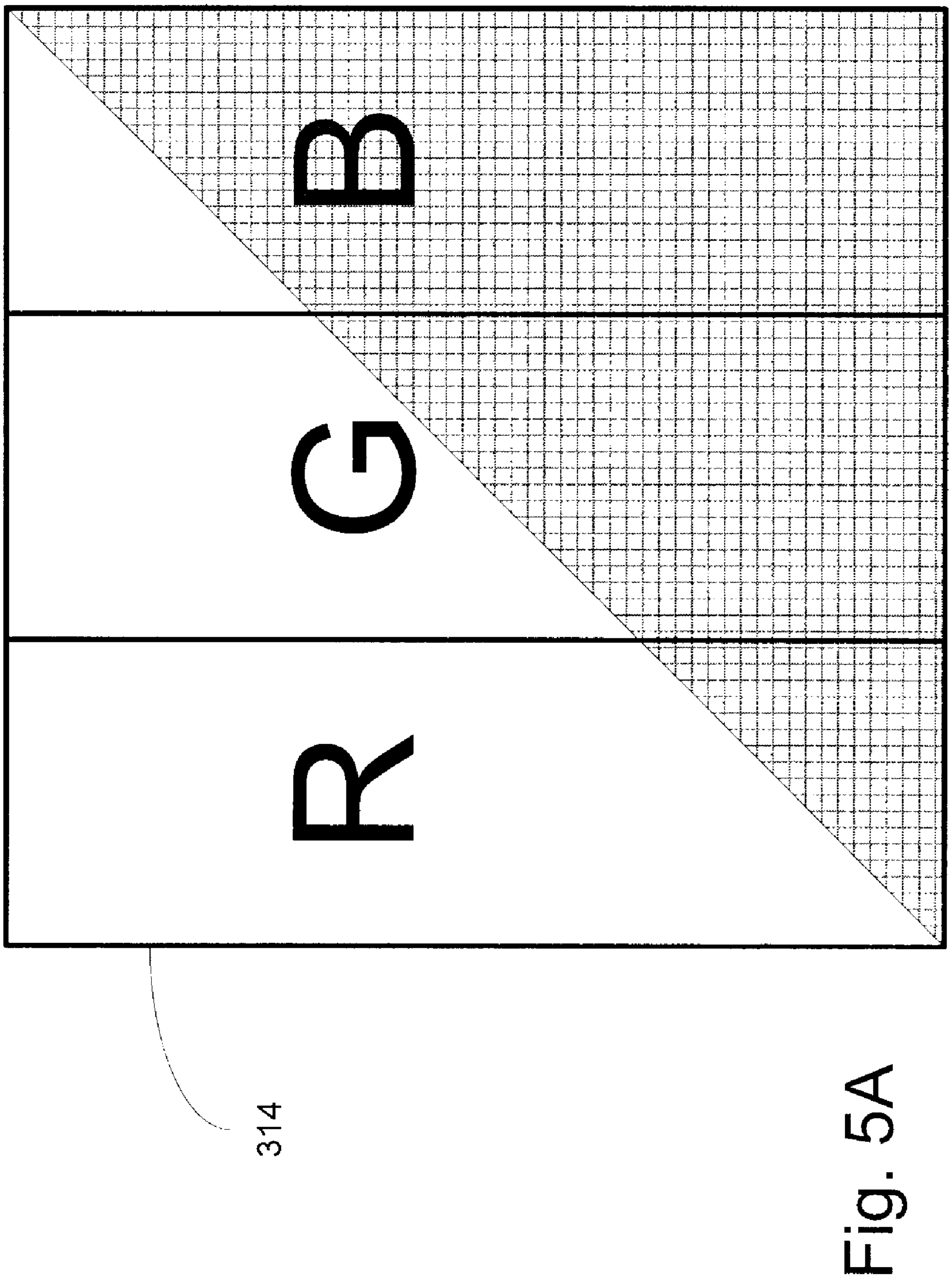
FIG. 5A illustrates the rasterization of the RGB pixel of FIG. 4.

FIG. 5A illustrates pixel 314 of FIG. 3 in further detail. While half of the pixel is covered by triangle 320, FIG. 5A shows that only $1/6^{th}$ of the red sub-pixel is covered and $5/6^{th}$ of the blue sub-pixel is covered. Half of the green sub-pixel is also covered. Various algorithms exist that account for the layout of the RGB sub-pixels. The algorithms may be part of the rasterization process or they may be part of a separate filtering process (dilation, smoothing, sharpening, etc.).

Figure 5B:
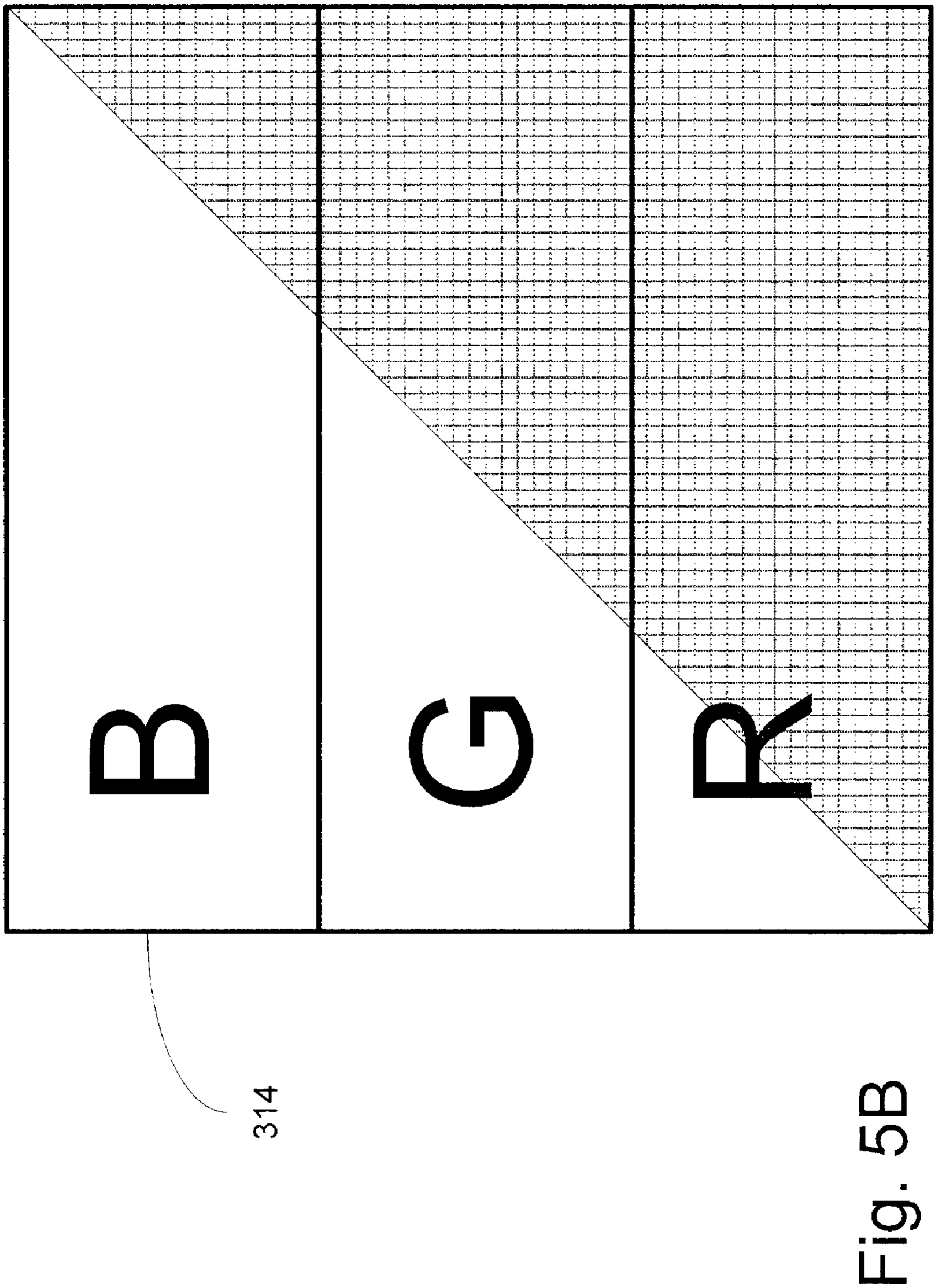
FIG. 5B illustrates the rasterized RGB pixel of FIG. 5 according to a second orientation.

FIG. 5B shows pixel 314 rotated counter-clockwise by 90 degrees. Given the rotation and the rectangular shape of the sub-pixels, the same overall coverage of pixel 314 by triangle 320 causes a different coverage of the sub-pixels. For example, $5/6^{th}$ of the red sub-pixel is now covered and only $1/6^{th}$ of the blue sub-pixel is covered. One of skill in the art will appreciate that a different algorithm or set of algorithms or set of parameters would be preferred for rendering text on a display screen where the pixels are oriented like pixel 314 in FIG. 5B than would be preferred for rendering text on a display screen having pixels oriented like pixel 314 in FIG. 5A.

Figure 6B:
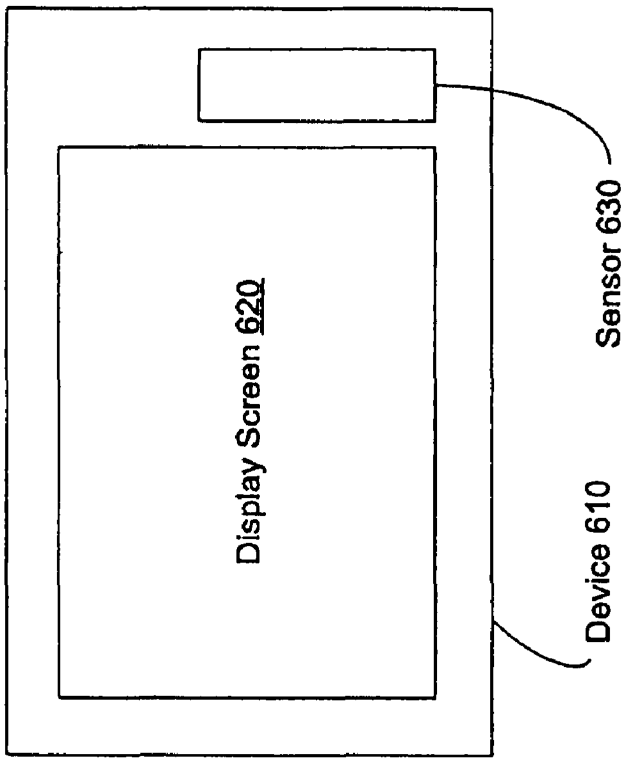
FIG. 6B illustrates the device of FIG. 6A according to a second orientation.
Figure 6A:
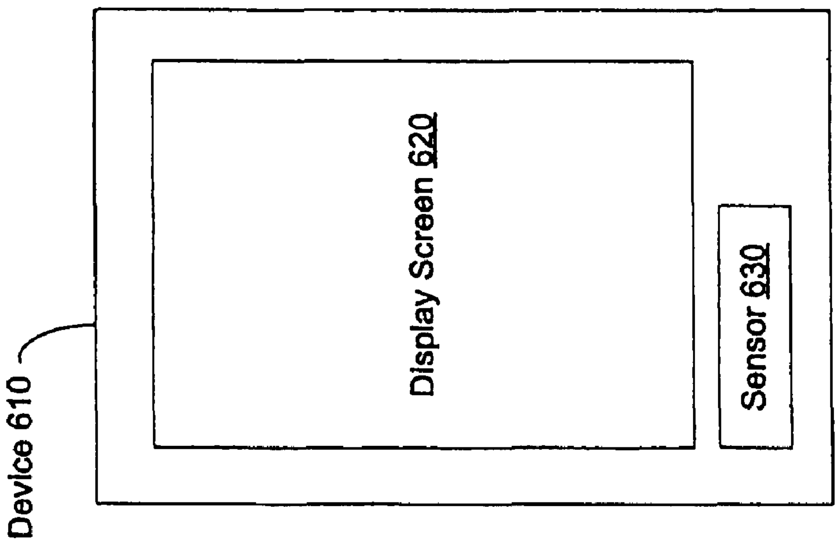
FIG. 6A illustrates a device with a display screen according to a first orientation.

FIG. 6 illustrates a device 610 (e.g., cell phone, MP3 player, PDA, etc.) having a display screen 620 for displaying text. Device 610 also includes a sensor 630. Sensor 630 detects or determines an external state of device 610. For example, sensor 630 might be an orientation sensor. An orientation sensor detects when device 610 has a portrait orientation (e.g., FIG. 6A) or a landscape orientation (FIG. 6B). The orientation sensor can also detect orientations that are partially landscape or partially portrait in some embodiments. Sensor 630 could also be a light sensor to detect the amount of external light shining on device 610. Sensor 630 could detect other external conditions in other embodiments. Device 610 could also include multiple sensors that detect various different external conditions.

Given a sensor, such as sensor 630 in FIG. 6, embodiments of the invention allow text to be dynamically filtered based on external conditions detected by the sensor. The dynamic text filtering may be accomplished using dynamic parameters in the filtering algorithm(s). Thus, based on the output from the sensor(s), the parameters are continuously updated, which continuously changes the output of the filter(s). In this way, the appearance of text rendered on the screen is continuously optimized and/or adapted based on external conditions (e.g., device orientation, light, etc.).

Figure 7:
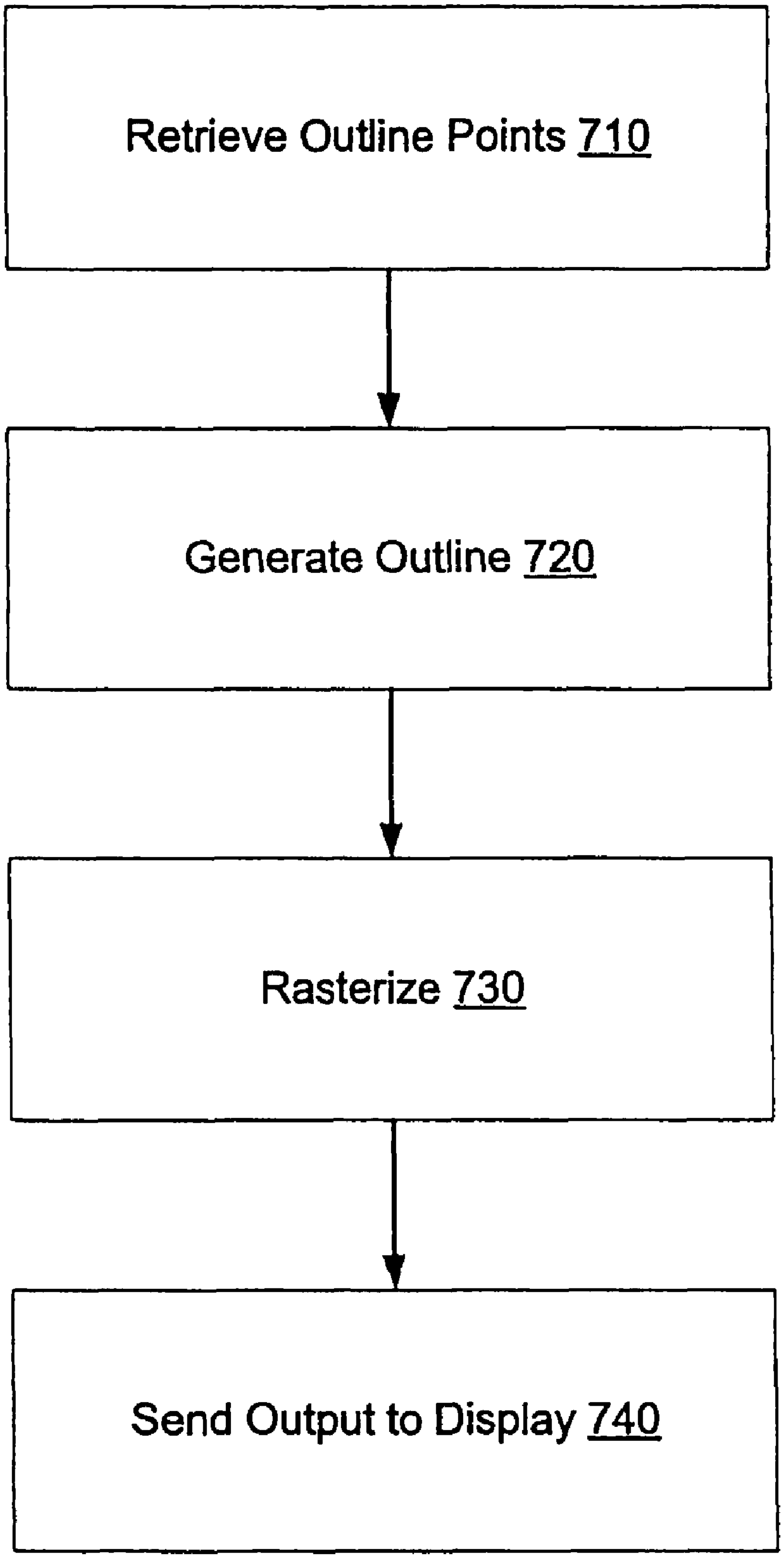
FIG. 7 is a flow diagram illustrating a process for filtering text.

FIG. 7 illustrates a process for rendering text according to some embodiments. Outline points for one or more characters are retrieved 710. An outline is generated from the retrieved points 720. The outline is rasterized 730. The rasterized image is output for display on the display device 740. The process described in FIG. 7 could be the process used for rendering text on a display screen based on one or more external conditions. The process of illustrated in FIG. 7 could be parameterized such that the output changes based on the changing parameters.

Figure 8:
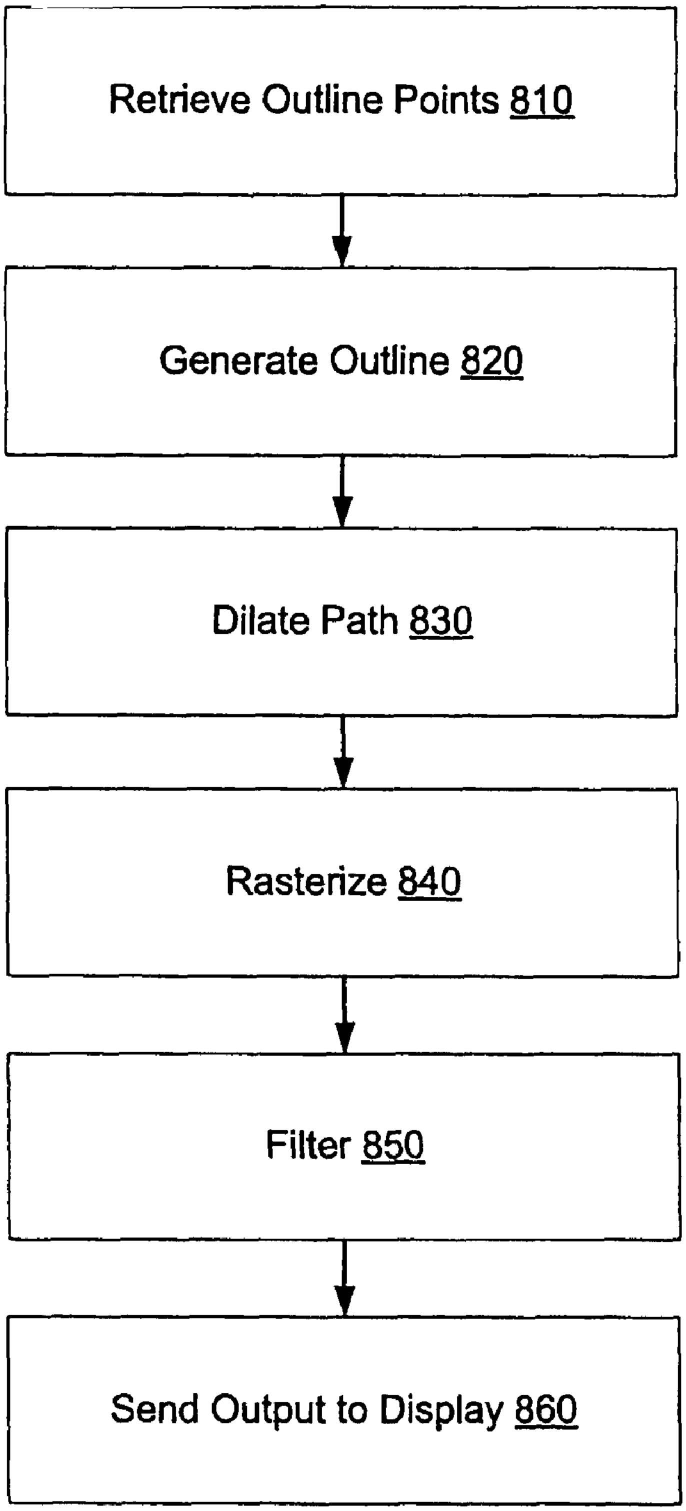
FIG. 8 is a flow diagram illustrating another process for filtering text.

FIG. 8 illustrates another process for rendering text according to some embodiments. Outline points for one or more characters are retrieved 810. An outline is generated from the retrieved points 820. The outline is dilated 830. The outline is then rasterized 840. The rasterized image is filtered 850. The filtered image is then output for display on the display device 860. The process described in FIG. 8 could be the process used for rendering text on a display screen based on one or more external conditions.

The process of illustrated in FIG. 8 could be parameterized such that the output changes based on the changing parameters. For example, when a device has a portrait orientation, a dilation parameter could be set to zero (i.e., no dilation). However, as the device is rotated, the dilation parameter could grow increasingly larger until it reaches a peak value (e.g., when the device has been rotated 90 degrees into a landscape orientation). Similar parameterization schemes could be used for any or all of the process steps of FIG. 8 in various embodiments.

Figure 9:
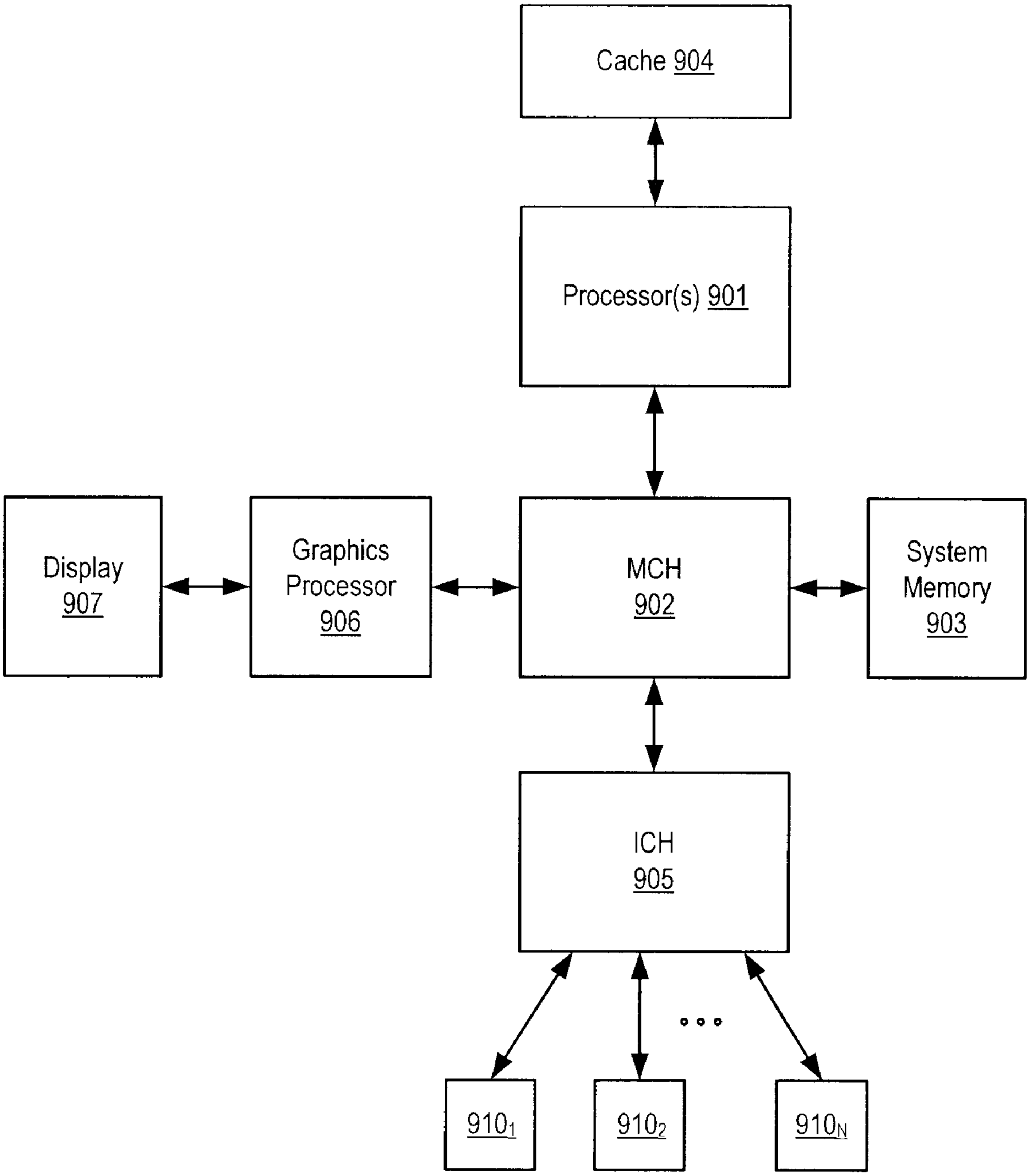
FIG. 9 illustrates an embodiment of a data processing system.

FIG. 9 illustrates an embodiment of a data processing system (e.g., a computer) for dynamically filtering text. The exemplary data processing system of FIG. 9 includes: 1) one or more processors 901; 2) a memory control hub (MCH) 902; 3) a system memory 903 (of which different types exist such as DDR RAM, EDO RAM, etc,); 4) a cache 904; 5) an I/O control hub (ICH) 905; 6) a graphics processor 906; 7) a display/screen 907 (of which different types exist such as Cathode Ray Tube (CRT), Thin Film Transistor (TFT), Liquid Crystal Display (LCD), DPL, etc.; and/or 8) one or more I/O devices 908. It will be understood that the system shown in FIG. 9 is an example of one type of data processing system and that other examples may have a different architecture and/or may have more or fewer components. It will further be understood that the system may be a general purpose computer, a special purpose computer, a PDA, a cellular telephone, a handheld computer, and entertainment system (e.g., MP3 player), or a consumer electronic device.

The one or more processors 901 execute instructions in order to perform whatever software routines the computing system implements. The instructions frequently involve some sort of operation performed upon data. Both data and instructions may be stored in system memory 903 and cache 904. Cache 904 is typically designed to have shorter latency times than system memory 903. For example, cache 904 might be integrated onto the same silicon chip(s) as the processor(s) and/or constructed with faster SRAM cells whilst system memory 903 might be constructed with slower DRAM cells. By tending to store more frequently used instructions and data in the cache 904 as opposed to the system memory 903, the overall performance efficiency of the computing system improves.

System memory 903 may be deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 903 prior to their being operated upon by the one or more processor(s) 901 in the implementation of a software program. Similarly, data that a software program determines should be sent from the computing system to an outside entity through one of the computing system interfaces, or stored into an internal storage element, is often temporarily queued in system memory 903 prior to its being transmitted or stored.

The ICH 905 is responsible for ensuring that such data is properly passed between the system memory 903 and its appropriate corresponding computing system interface (and internal storage device if the computing system is so designed). The MCH 902 is responsible for managing the various contending requests for system memory 903 access amongst the processor(s) 901, interfaces and internal storage elements that may proximately arise in time with respect to one another.

One or more I/O devices 908 are also implemented in a typical computing system. I/O devices generally are responsible for transferring data to and/or from the computing system (e.g., a networking adapter); or, for large scale non-volatile storage within the computing system (e.g., hard disk drive). ICH 905 has bidirectional point-to-point links between itself and the observed I/O devices 908.

Embodiments of the invention may include various operations as set forth above. The operations may be embodied in machine-executable instructions which cause a general-purpose or special-purpose processor to perform certain operations. Alternatively, these operations may be performed by specific hardware components that contain hardwired logic for performing the operations, or by any combination of programmed computer components and custom hardware components.

Elements of the present invention may also be provided as a machine-readable medium (e.g., a computer readable medium) for storing the machine-executable instructions. The machine-readable medium may include, but is not limited to, floppy diskettes, optical disks, CD-ROMs, and magneto-optical disks, ROMs, RAMs, EPROMs, EEPROMs, flash, magnetic or optical cards, propagation media or other type of media/machine-readable medium suitable for storing electronic instructions.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method, comprising:

receiving an indication of an external state of a device; and dynamically filtering text that is displayed on a display screen of the device based on the external state of the device such that the text is maintained at a constant orientation on the display screen relative to a fixed point external to the device after the device transitions from a first physical orientation to a second physical orientation and wherein dynamically filtering text based on the external state of the device comprises:

retrieving outline points for one or more characters;

generating an outline from the outline points;

filtering the outline based on the external state of the device after changing from the first to the second physical orientation;

rasterizing the outline into a bitmapped image;

filtering the bitmapped image based on the external state of the device after changing from the first to the second physical orientation; and generating a glyph from the filtered bitmapped image that is displayed as text on the display screen of the device.

2. The method of claim 1, wherein the external state of the device is based on one or more external conditions.

3. The method of claim 2, wherein the one or more external conditions are selected from a group consisting of device orientation and external light.

4. The method of claim 1, wherein receiving an indication of an external state of the device further comprises receiving a signal from one or more sensors indicating the external state of the device.

5. The method of claim 4, wherein the one or more sensors are selected from the group consisting of an orientation sensor and a light sensor.

6. The method of claim 1, wherein filtering the outline comprises dilating the outline.

7. The method of claim 1, wherein filtering the bitmapped image comprises smoothing the bitmapped image.

8. A device, comprising:

a sensor to determine an external state of the device;

a processor to dynamically filter text that is displayed based on the external state of the device; and a display screen to display the dynamically filtered text, wherein the processor further dynamically filters text such that the text is maintained at a constant orientation on the display screen relative to a fixed point external to the device after the device transitions from a first physical orientation to a second physical orientation wherein the processor, when the processor dynamically filters text based on the external state of the device, is configured to:

retrieve outline points for one or more characters;

generate an outline from the outline points;

filter the outline based on the external state of the device after changing from the first to the second physical orientation;

rasterize the outline into a bitmapped image;

filter the bitmapped image based on the external state of the device after changing from the first to the second physical orientation; and generate a glyph from the filtered bitmapped image that is displayed as text on the display screen of the device.

9. The device of claim 8, wherein the display screen is a liquid crystal display (LCD) screen.

10. The device of claim 8, wherein the device is one or more of a cell phone, a smart phone, a personal digital assistant (PDA), a portable game console, or a media player.

11. The device of claim 8, wherein the external state of the device is a physical orientation of the device.

12. The device of claim 8, wherein the external state of the device is based on an amount of external light shining on the device.

13. A method, comprising:

receiving an indication of a first orientation of a device from an orientation sensor;

filtering a character that is displayed as text on a display screen of the device according to the first orientation;

dynamically re-filtering the character to maintain the orientation of the text on the display screen relative to a fixed point that is external to the device during a transition from the first device orientation to a second device orientation and wherein the first orientation is one of a landscape orientation and a portrait orientation and the second orientation is the other one of the landscape orientation and the portrait orientation and wherein filtering a character according to the landscape orientation comprises:

retrieving outline points for the character;

generating an outline from the outline points;

dilating the outline after changing to the landscape orientation;

rasterizing the outline into a bitmapped image;

filtering the bitmapped image; and generating a glyph from the filtered bitmapped image that is displayed as text on the display screen of the device.

14. The method of claim 13, wherein filtering a character according to the portrait orientation comprises:

retrieving outline points for the character;

generating an outline from the outline points;

rasterizing the outline into a bitmapped image; and generating a glyph from the bitmapped image to be displayed as text on the display screen of the device.

15. An article of manufacture comprising a computer-readable non-transitory storage medium having content stored thereon to provide instructions to result in an electronic device performing operations including:

receiving an indication of an external state of a device; and dynamically filtering text that is displayed on a display screen of the device based on the external state of the device such that the text is maintained at a constant orientation on the display screen relative to a fixed point external to the device after the device transitions from a first physical orientation to a second physical orientation and wherein the dynamically filtering operation includes:

retrieving outline points for one or more characters;

generating an outline from the outline points;

dilating the outline based on the external state of the device after a change to the second physical orientation;

rasterizing the outline into a bitmapped image;

smoothing the bitmapped image based on the external state of the device; and generating a glyph from the filtered bitmapped image that is displayed as text on the display screen of the device.

16. The article of manufacture of claim 15, wherein receiving an indication of the external state of the device further comprises receiving a signal from one or more sensors indicating the external state of the device.

17. The article of manufacture of claim 16, wherein the one or more sensors are selected from the group consisting of an orientation sensor and a light sensor.

* * * * *